Patented July 7, 1931

1,813,879

UNITED STATES PATENT OFFICE

HANS KÄMMERER, OF MANNHEIM, GERMANY, ASSIGNOR TO GENERAL ANILINE WORKS, INC., OF NEW YORK, N. Y., A CORPORATION OF DELAWARE

DYESTUFFS CONTAINING CHROMIUM AND PROCESS OF MAKING

No Drawing. Application filed November 27, 1926, Serial No. 151,255, and in Germany December 1, 1925.

In the specifications of the U. S. Patents 1,090,123, 1,264,604, the German Patents 338,086, 397,331 and 419,825, and the U. S. application Ser. No. 124,776, filed July 24, 1926, there is described the preparation of chromium compounds of chromable dyestuffs, which are very valuable tinctorially.

I have now found that entirely different chromium compounds of chromable dyestuffs are obtained when the said dyestuffs are treated with salts of trivalent chromium in the presence of water-soluble mineral acid salts of other metals than are liable to form metal compounds with the dyestuffs (the expression "metal compounds" is of course not to comprise salts of sulfonic or carboxylic acid groups contained in the dyestuff molecule) with heat and with or without pressure. Thus for example chromium and copper salts are not suitable for the purpose of the present invention. The said salts may also be formed during the reaction itself for example by the action of the mineral acid present or formed in the reaction mixture, on water-insoluble salts, for example calcium or magnesium carbonate. The new chromium compounds obtainable according to this invention differ from those already known in their color shade, while possessing the valuable tinctorial properties and fastness of the known dyestuffs containing chromium. It is therefore possible to obtain entirely different chromium compounds from a given original dyestuff.

Dyestuffs obtained according to this invention contain two atoms of chromium for each three chromable groups of the dyestuff treated. The shade of the dyeings of these new dyestuffs on wool is deeper and in most cases faster to alkalis than those obtained with dyestuffs containing one atom of chromium for each chromable group.

The following examples will further illustrate how the invention may be carried out in practice, but the invention is not limited to the examples. The parts are by weight.

Example 1

40 parts of the dyestuff obtainable from diazotized 4-nitro-2-aminophenol-6-sulfonic acid and $\beta$-naphthol are heated for 3 hours or thereabouts at 120° centigrade in an autoclave with 500 parts of a solution of chromium formate (containing 8.4 parts of $Cr_2O_3$) with the addition of 60 parts of sodium chloride. The chromium compound, which is filtered off by suction in the warm and dried, dyes black shades, of excellent fastness, on wool.

When no sodium chloride is added, a violet-brown shade is obtained.

Other salts, such as potassium sulfate, lead nitrate, magnesium sulfate, and the like, act similarly to sodium chloride. The formation of the chromium compound can also be effected at ordinary pressure by longer boiling.

Example 2

50 parts of the dyestuff obtainable from the nitrated diazo compound of 1-amino-2-naphthol-4-sulfonic acid and $\beta$-naphthol, are heated at 122° centigrade for 4 hours or thereabouts under pressure, with 500 parts of a solution of chromium formate (containing 8.4 parts of $Cr_2O_3$), to which 150 parts of sodium chloride have been added. The resulting dyestuff containing chromium is filtered off by suction at 60° centigrade and dried. It dyes wool black shades of excellent fastness.

I claim:

1. The process of producing dyestuffs containing chromium which comprises heating a chromable dyestuff with a salt of trivalent chromium in the presence of a water soluble salt of a strong mineral acid and a metal other than those which form metal compounds with the dyestuff.

2. The process of producing dyestuffs containing chromium which comprises heating a chromable dyestuff under pressure with a salt of trivalent chromium in the presence of a water soluble salt of a strong mineral acid and a metal other than those which form metal compounds with the dyestuff.

3. As new articles of manufacture, dyestuffs containing two atoms of chromium for each three chromable groups therein which are obtainable by treating chromable dyestuffs with a salt of trivalent chromium in the presence of a water soluble salt of a strong mineral acid and a metal other than those which form metal compounds with the dyestuff, and distinguishable by the shades of their dyeings from the known products obtained from the same dyestuffs by chromation in the absence of such mineral salts.

4. As a new article of manufacture the dyestuff containing chromium which is obtainable by treating the azo dyestuff obtainable from the nitrated diazo compound of 1-amino-2-naphthol-4-sulfonic acid and β-naphthol, with a salt of trivalent chromium in the presence of a water soluble salt of a strong mineral acid and a metal other than those which form metal compounds with the dyestuff, which chromium compound dyes wool black shades of excellent fastness.

5. The process of producing dyestuffs containing chromium which comprises heating a chromable dyestuff with a salt of trivalent chromium in the presence of sodium chloride.

6. The process of producing dyestuffs containing chromium which comprises heating an azo dye under pressure at a temperature of about 120° C. with chromium formate in the presence of sodium chloride.

7. The process as defined in claim 1 wherein the heating is effected in the presence of potassium sulphate.

8. The process as defined in claim 1 wherein the heating is effected in the presence of lead nitrate.

9. As new articles of manufacture, azo dyestuffs in the form of chromium compounds and containing two atoms of chromium for each three chromable groups of the azo dyestuffs molecules, said chromium azo dyestuffs dyeing wool various shades fast to light and washing.

In testimony whereof I have hereunto set my hand.

HANS KÄMMERER.